Oct. 14, 1952  S. S. JOHNS  2,613,823
AUTOMATIC BARREL HANDLING DEVICE FOR HORN PRESSES
Filed Nov. 10, 1950  4 Sheets—Sheet 1
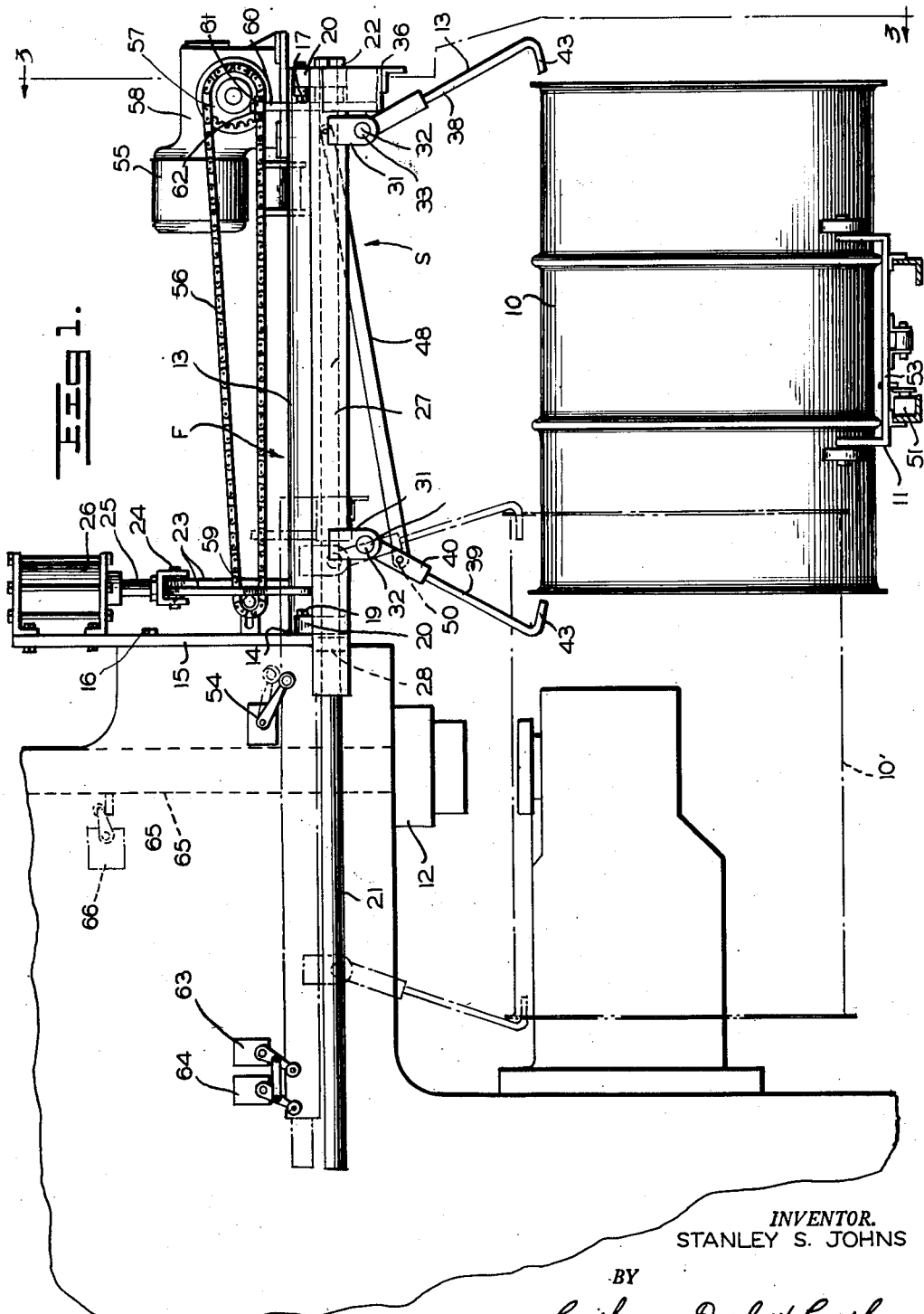
INVENTOR.
STANLEY S. JOHNS
BY
Cushman, Darby & Cushman
ATTORNEYS

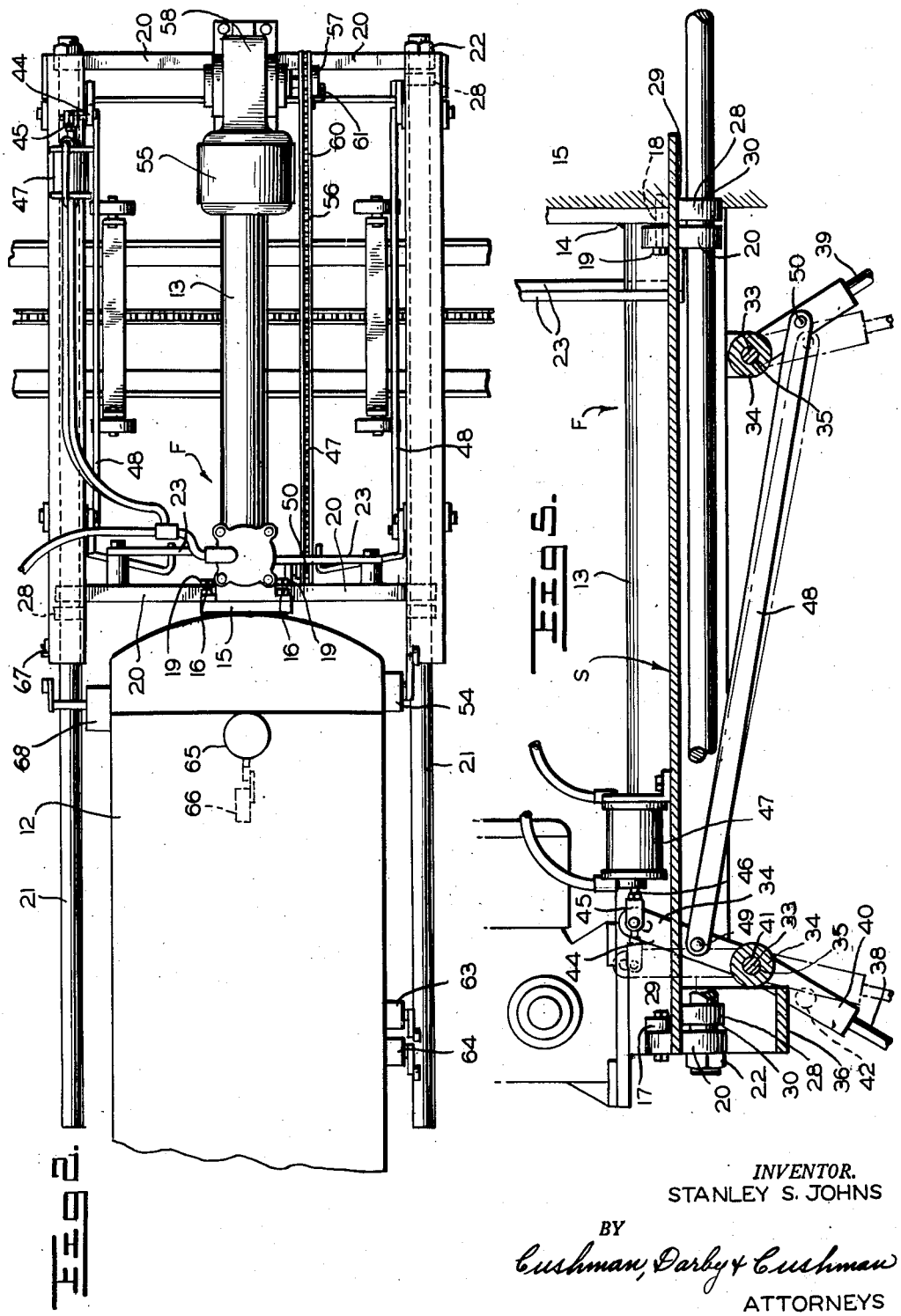

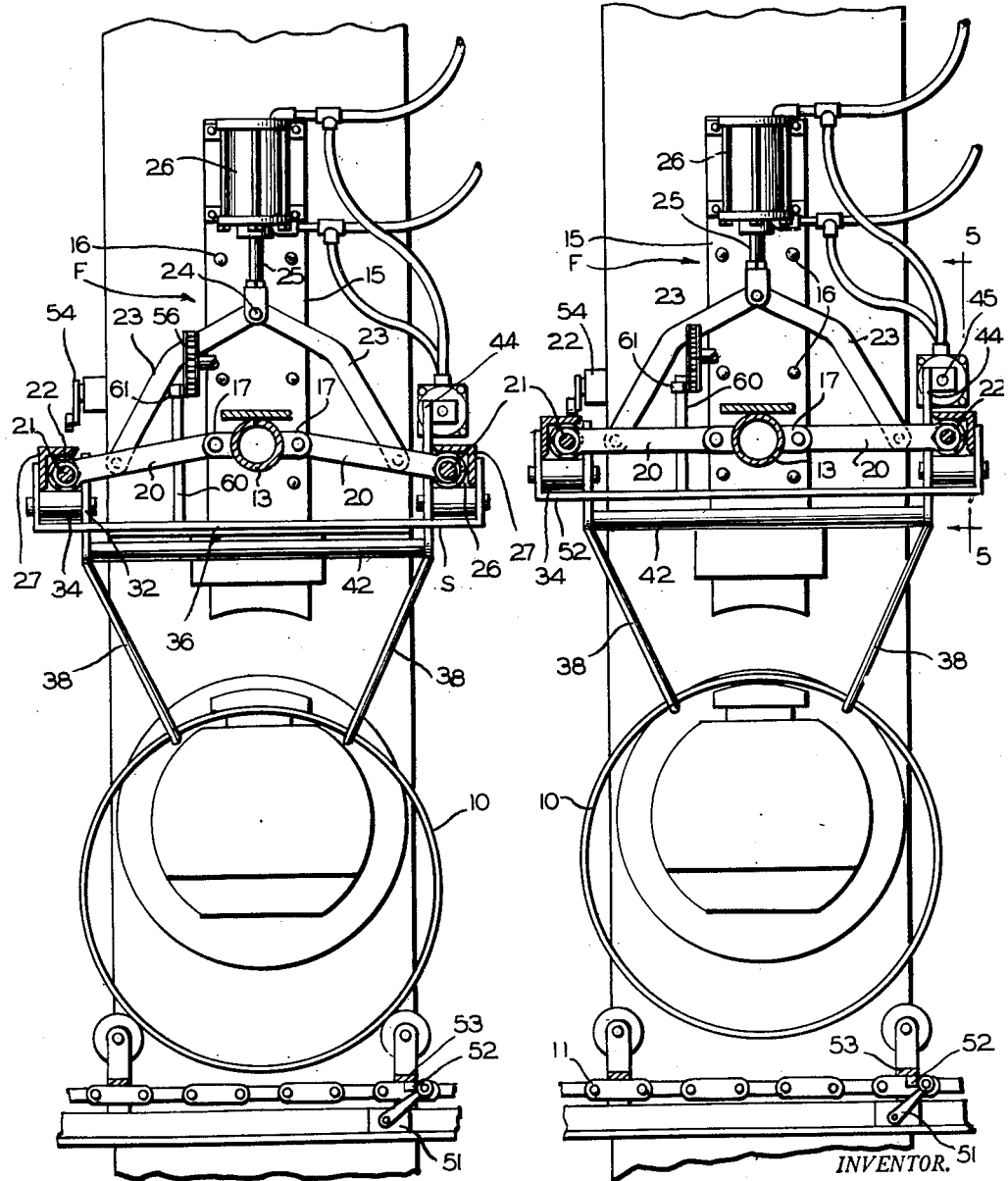

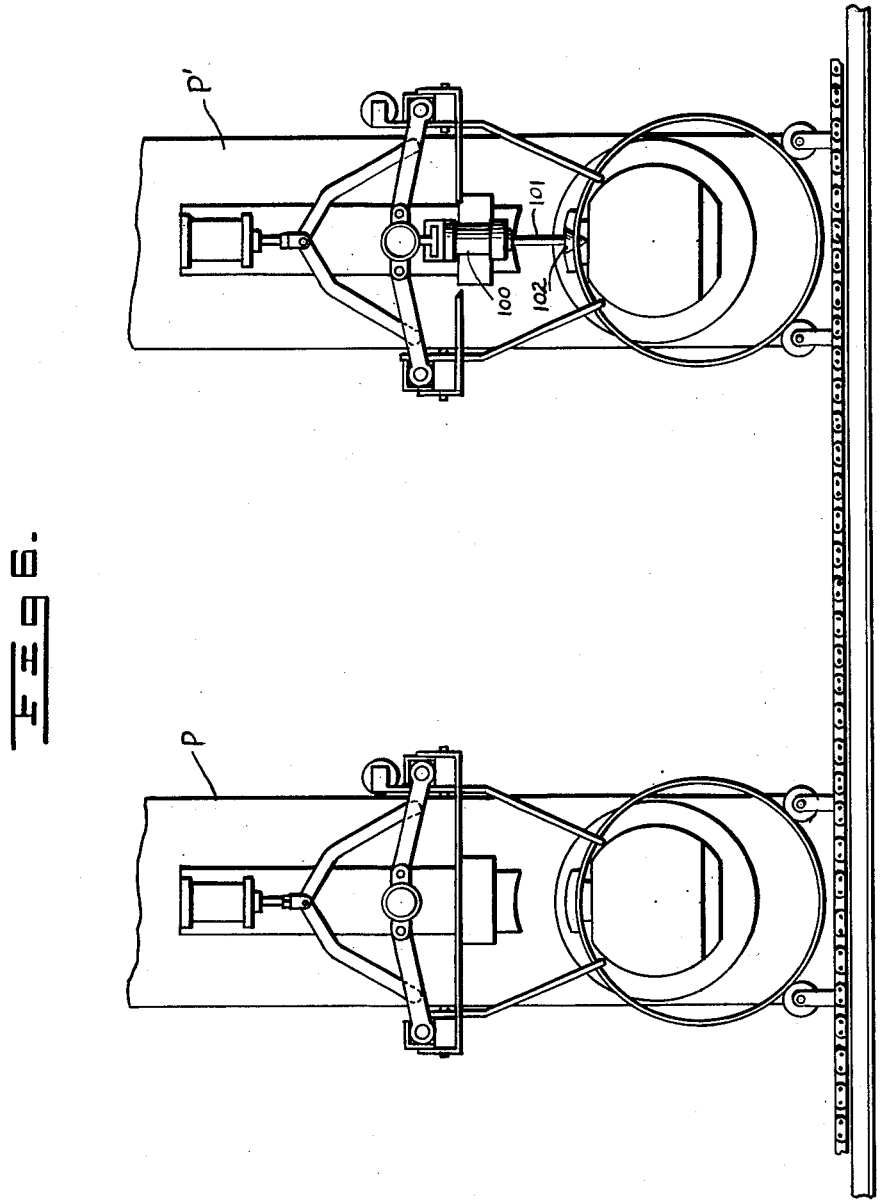
INVENTOR
STANLEY S. JOHNS
BY Cushman, Darby & Cushman
ATTORNEY

Patented Oct. 14, 1952

2,613,823

UNITED STATES PATENT OFFICE 2,613,823

AUTOMATIC BARREL HANDLING DEVICE FOR HORN PRESSES

Stanley S. Johns, Baltimore, Md., assignor to Rheem Manufacturing Company, Richmond, Calif., a corporation of California Application November 10, 1950, Serial No. 195,096

12 Claims. (Cl. 214—1)

This invention relates to the manufacture of metal containers, notably, large sized metal shipping drums used for oil, chemicals and bulk products in general.

The primary object of the invention is to provide means for facilitating the "horn" press operations, namely, forming of the side opening in such drums and insertion and locking of a threaded ring liner therein during the course of fabricating the drums on a continuous line.

Means have been devised for conveying the cylinders from which the drums are completed at high speed in a line on which the cylinders are subjected to the various consecutive fabricating operations. The present invention provides a handling device by which the cylinders are automatically lifted from the conveyor, carried to the "horn" press, operated upon therein, and returned to the conveyor, thereby markedly accelerating the speed of the fabricating operations in the line.

Referring to the drawings:

Figure 1 is a side elevation partly broken away showing a horn press in association with the improved handling device;

Figure 2 is a top plan view;

Figure 3 is a vertical section taken along the line 3—3 of Figure 1 and showing the cylinder carriage in a lowered position;

Figure 4 is a vertical section similar to Figure 3 and also taken on the line 3—3 of Figure 1 and showing the cylinder carriage in a raised position;

Figure 5 is a fragmentary sectional view taken along the line 5—5 of Figure 4, and Figure 6 is a diagrammatic view of a modified form of the invention.

Referring to the drawings, particularly Figure 1, the cylinders 10 are carried transversely upon a suitable intermittently operated conveyor such as a "Grotnes" conveyor, indicated as a whole at 11, and by which the cylinders are carried for operations at the various fabricating stations. The drums in various stages of formation are moved along the drum line at a relatively high speed.

One of the operations consists in subjecting the cylinder to a "horn" press for forming a hole or opening in the side of the drum, and inserting and locking a threaded ring in the opening to receive a threaded closure plug as is customary in large size shipping drums. In accordance with the present invention, and referring to Figure 1, the drum is stopped on the conveyor at a position where it is in line with the horn press, indicated as a whole at 12, and the construction now to be described is concerned with handling, transferring and positioning the cylinder 10 upon the press 12 for performing such operations and returning the cylinder to the conveyor line for subsequent operations. To this end, there is associated with the horn press 12 a handling device indicated as a whole at 13, which engages a cylinder, raises and moves it to the dotted line position, as shown at 10' in Figure 1, where it can be operated upon by the horn press 12 and then returns it to the conveyor, where the cylinder is released and carried by the conveyor to the next operation.

The improved construction of this invention consists of a fixed frame F which includes a horizontal tubular member 13 secured at one end 14, as by welding, to an upstanding plate 15, the latter being bolted to the horn press at 16 and thereby the frame is supported in fixed position.

Referring to Figures 3 and 4, laterally extending lugs 17 are welded or otherwise secured to the opposite sides of the tubular member 13 at its remote end from the plate 15, as indicated in Figure 1. Also referring to Figure 5, lugs 18 are secured to the upstanding plate 15 by pivot pins 19. The lugs 18 are similarly positioned relative to the tubular member 13 as the lugs 17 secured to the member 13, i. e., extend laterally adjacent opposite sides of member 13 on the upstanding plate 15.

Each of the lugs 17 and pivot points 18 is connected to a link 20 which, in turn, is pivoted upon a fixed cylindrical bar or rod 21, a pair of such fixed bars or rods being employed as best shown in Figure 2. At the ends of the bars 21, suitable stop nuts 22 are provided, as shown in Figures 3 and 4. Pivotally connected to the pair of links 20 located adjacent the plate 15 and intermediate their ends, are the upstanding links 23, as shown in Figures 3 and 4. These links 23 are connected to a common pivot 24 carried by the piston rod 25 of an air cylinder 26.

The air cylinder 26, tubular member 13 and upstanding plate 15 are all fixed with respect to the horn press 12, and the rods 21 are movable vertically up and down in response to movement of the piston rod 25. This movement of the rods 21 is obtained from the single air cylinder 26, the rods 21 remote from the plate being supported for up and down movement by the links 20 connected thereto and to the lugs 17, as previously described.

Positioned on the bars 21 for sliding movement thereon are angle irons 27 which are carried by the bars through the medium of bearing blocks 28 which are welded or otherwise secured to the angle irons, as shown at 29. The bearing blocks 28 have openings 30 for slidably receiving the slide rods 21 whereby the angle irons and rods are slidable relative to each other. A plurality of depending arms 31 welded to the sides of the respective angle irons 27 adjacent plate 15 and remote therefrom, as shown, extend downwardly of the angle irons and are provided with openings 32 within which extend pivot pins or bolts 33 upon which are mounted bearing blocks 34 having openings 35 through which the pivot pins 33 extend, as shown in Figures 3 and 4. Welded to the lower ends of the pairs of depending arms 31 remote from plate 15, as shown at 36, is a cross brace 37.

The angle irons 27, depending arms 31, bearing blocks 34 and brace 37 constitute a sliding frame element generally designated by the letter S, as shown in Figures 3 and 4. This frame element carries the cylinder pick-up and transfer mechanism which will now be described.

The pick-up mechanism, as shown in Figures 1, 3 and 4, comprise spaced pairs of depending arms 38—39, the arms 38 remote from the upstanding plate 15 being pivoted at their upper ends in the bearing blocks 34, as shown in Figures 3 and 4. That is, each of the arms 38 which is extended upwardly, as shown at 40, has an opening 41 therein to receive the pivot pin 33, and the arms 38 are connected together below the brace 37 by a cross bar 42 whereby this pair of arms 38 will have its respective arms moved simultaneously. At their lower ends, the arms 38—39 have hooks 43 extending inwardly, as shown at Figure 1, to engage within a cylinder so as to grip the same for movement, as will be later described.

An extension 44 of one of the arms 38 is pivotally connected by suitable linkage, as shown at Figures 2 and 5, at 45 to the piston 46 of an air cylinder 47, whereby the said arm 38 is moved to move both the arms 38 together. The other pair of arms 39, located adjacent to upstanding plate 15, is pivotally mounted in the same manner as the arms 38 on the pivot pins 33 and is moved about the pivot points 33 by reason of each of the arms 39 being connected to one end of a link 48, as shown at 50, the links 48 being connected at their other ends, as shown at 49, to the extensions 44 of the arms 38, one of which has its extension 44 pivotally connected to the piston rod 46, as described above.

From the foregoing, it will be observed that movement of the piston rod 25 of the air cylinder 26 up or down will raise or lower the slide rods 21 and thereby lift or lower the arms 38—39 to lift a cylinder 10, as shown in Figure 4, from the conveyor or deposit the same thereon, as shown in Figure 3. Operation of the piston rod 46 from air cylinder 47 will serve to contract the pairs of arms 38—39 toward each other to grip a cylinder, as shown in Figure 1, or move the pairs of arms away from each other to release a cylinder.

Referring to Figures 3 and 4, movement of the piston rod 25 by air cylinder 26 upwardly or downwardly raises or lowers links 20 and with them the bars 21 upon which each pair of arms 38 and 39 are mounted, as shown in Figures 3 and 4. With this lifting or lowering movement, as the case may be, actuation of the air cylinder 47 operates the piston 46 which, in turn, expands or contracts the arms 38—39 relative to the edges of the cylinder 10 by reason of the linkage connection between the piston rod 46 and one of the arms 38 and the cross links 48 which connect each of the arms 38 with each of the arms 39.

In the raising of the carriage S the arms 38 and 39 first contract to engage the cylinder and then immediately thereafter the lifting of the frame takes place. In the lowering of the cylinder upon the conveyor, the descent of the frame precedes the expansion of the arms to release the cylinder upon the conveyor so that, in effect, the cylinder is deposited on the conveyor from its raised position and simultaneous with its positioning on the conveyor the arms expand to release the cylinder for movement with the conveyor.

In further explanation of the foregoing, the cylinders 26 and 47 are actuated by means of a single conventional multi-way solenoid valve (not shown) and the pressure as applied to lifting the barrel first enters cylinder 47 by means of the path of least resistance due to the greater weight carried by air cylinder 26. In other words, relatively less pressure is required to operate air cylinder 47 and, therefore, the arms 38 and 39 will be operated to engage the cylinder before the lifting mechanism is operated by the air cylinder 26 which requires a greater pressure. In the reverse procedure as the barrel is being returned to the conveyor the cylinder 26 is first actuated due to the greater weight of the frame, and as the barrel is deposited upon the conveyor, the pressure is relieved from cylinder 26 and is transferred to cylinder 47, thus opening hook arms 38 and 39.

The actuation of the air cylinders is immediately accomplished as the conveyor 11 reaches the horn press station, as shown in Figure 1, by actuation of an electrical limit switch 51 located at this point which is contacted by a depending lug 52 fixed to a cross member 53 on the conveyor 11 to throw the switch into energized position. The air cylinders 26 and 47 are operated by means of electrical connections with the limit switch 51, upon energization thereof, through the multiway solenoid valve above referred to.

Referring to Figures 1 and 4, in actual operation, the switch 51 is energized and the cylinder 10 is gripped and raised by the arms 38—39, as described above. As the carriage S rises, one of the angle irons 27 engages a limit switch 54, shown in Figures 3 and 4, which, in turn, actuates an electric motor 55, as shown in Figure 2. The motor drives a chain 56 by means of a sprocket 57 on a reduction gear 58 and a sprocket 59 mounted on the fixed plate 15. Fixed to the cross brace member 36 of the movable carriage S at the pair of arms 38 remote from plate 15, is an upstanding rod 60, secured by a clamp 61 to the drive chain 56, as shown at 62, whereby, upon actuation of the motor 55, the movable carriage S with the arms 38—39 engaged with the cylinder 10, is carried laterally from the conveyor upon the slide bars 21 to the dotted line position shown in Figure 1 where the cylinder can be worked upon by the horn press 12.

As the carriage S moves laterally upon the bars 21 the leading edge of one of the angle irons of the carriage actuates a limit switch 63, as shown in Figure 1, to discontinue the operation of the motor and the drive chain and thus stop movement of the cylinder toward the press to position the cylinder for actuation by the horn press at the proper location. At the same time, a limit switch 64 connected with the switch 63 by suitable linkage is actuated to operate the horn press. The horn press automatically forms the opening in the side of the cylinder, inserts a threaded ring or flange and locks the same in the cylinder, and when this operation is completed, the rod 65 of the press rises automatically, as shown in Figure 1. As it ascends, engagement is made with the limit switch 66 which reverses the motor 55 and returns the carriage S and the cylinder 10 to a position over the conveyor 11, as shown in Figure 4. In the return of the cylinder 10 to the position above the conveyor, the switch striker 67 on one of the angle irons 27 engages a limit switch 68 which actuates the air cylinders 26 and 47 to reverse the movement of the respective pistons thereof and de-energizes the motor 55. As explained above, the levers 20 and 23 are lowered, as shown in Figure 3, and then the arms 38—39 expand outwardly from the cylinder 10 to release the same to position the drum 10 upon the conveyor whereby it may travel to the next station. The foregoing operations are carried out each time a cylinder reaches the horn press station on the continuous drum line.

Figure 6 is a diagrammatic view of a modified form of the invention wherein a pair of the lifting structures illustrated herein are utilized where multiple presses are employed, e. g., where the first press makes the side opening in the cylinder and embosses the same, whereupon the cylinder is carried to a second press and the flange or insert introduced and locked in the opening.

Referring to Figure 6, I have illustrated a modified form of the invention which is employed where two presses P and P' are utilized in the line respectively for (1) producing the side opening and (2) embossing and inserting the threaded flange for receiving the closure plug.

With such a construction, two of the lifting devices illustrated herein are employed, and Figure 6 is a modified form of the invention utilized in connection with the second press, wherein the threaded flange is inserted in the side opening of the cylinder. This requires that the opening in the cylinder properly register with the flange-inserting means, and therefore, proper positioning of the cylinder with respect to the press is required so that the side opening will register with the flange-inserting means. There is thus associated with the mechanism illustrated herein a third air cylinder 100 adjustably mounted on the fixed frame F, and which operates reciprocating centering rod 101 having a tapered or conical lower end 102. As the first operation for the side opening is completed at the first press P, the cylinder is returned to the conveyor by the mechanism described above and thereafter moves along the conveyor to the second press P' where a similar mechanism is provided. At this point, the air cylinder 100 is first actuated in the same manner as the air cylinders 26 and 47 and causes the rod 101 to descend and engage its tapered end 102 in the side opening of the cylinder, just prior to the gripping of the same by the members 38, 39. This assures that the cylinder will be centered, i. e., when carried into the flange-inserting press P', the side opening will be in aligned relation to receive the threaded flange. It will be understood that after the hook members 38, 39 engage the cylinder, the piston of the air cylinder 100 is retracted by actuation of a conventional limit switch (not shown) to raise the tapered end 102 out of the side opening in the cylinder prior to the raising and transverse movement of the carriage S. The operation and mechanism are otherwise similar to that described above.

I claim:
1. Apparatus of the class described comprising a fixed member, longitudinally spaced pairs of arms pivotally connected to said member, guide rods carried by said arms, frame members slidably carried by said rods, means for raising and lowering said arms and the rods and frame members carried thereby and holding them in raised and lowered positions, depending hooked arms pivotally carried by said frame members, means for moving the hooked arms toward and away from each other and holding them in their respective positions, and means operated when said frame members are in raised position to reciprocate the frame members on said rods.

2. Apparatus of the class described comprising a fixed member, longitudinally spaced arms pivotally connected to said member and extending from opposite sides thereof, guide rods carried by said arms, frame members slidably carried by said rods, means for raising and lowering said arms and the rods and frame members carried thereby and holding them in raised and lowered positions, depending hooked arms pivotally carried by said frame members, means for moving the hooked arms toward and away from each other and holding them in their respective positions, and means operated when said frame members are in raised position to reciprocate the frame members on said rods.

3. Apparatus of the class described comprising a fixed member, longitudinally spaced pairs of arms pivotally connected to said member, guide rods carried by said arms at opposite sides of said member, frame members slidably carried by said rods, means for raising and lowering said arms and the rods and frame members carried thereby and holding them in raised and lowered positions, depending hooked arms pivotally carried by said frame members, means for moving the hooked arms toward and away from each other and holding them in their respective positions, and means operated when said frame members are in raised position to reciprocate the frame members on said rods.

4. Apparatus of the class described comprising a fixed member, longitudinally spaced pairs of arms pivotally connected to said member, guide rods carried by said arms, frame members slidably carried by said rods, pneumatic means for raising and lowering said arms and the rods and frame members carried thereby and holding them in raised and lowered positions, depending hooked arms pivotally carried by said frame members, pneumatic means for moving the hooked arms toward and away from each other and holding them in their respective positions, and motor means operated when said frame members are in raised position to reciprocate the frame members on said rods.

5. Apparatus of the class described for lifting an article from a conveyor, transferring it to a working device and returning the worked article to the conveyor comprising a fixed member, longitudinally spaced arms pivotally connected to said member and extending from opposite sides thereof, guide rods carried by said arms and extending in the proximity of said working device, frame members slidably carried by said rods, means for raising and lowering said arms and the rods and frame members carried thereby and holding them in raised and lowered positions, depending hooked arms pivotally carried by said frame members, means for moving the hooked arms toward and away from each other to grip and release an article, and means operated when said frame members are in raised position to move the frame members on said rods toward and away from the working device.

6. An apparatus according to claim 5 having means for automatically limiting the movement of the frame members and the article carried thereby toward and from the working device.

7. An apparatus according to claim 5 wherein the means for raising and lowering the arms and for moving the hooked arms are pneumatic means and the means for moving the frame members are motor means.

8. An apparatus according to claim 5 wherein the means for raising and lowering the arms and for moving the hooked arms are pneumatic means and the means for moving the frame members are motor means, said pneumatic means being article actuated to grip and raise an article from the conveyor in advance of the actuation of said motor means to move the article to the working device, and said motor means being operated in advance of said pneumatic means to return the article from the working device and position and release it upon the conveyor.

9. An apparatus according to claim 5 wherein the means for raising and lowering the arms and for moving the hooked arms are pneumatic means and the means for moving the frame members are motor means, said pneumatic means being article actuated to grip and raise an article from the conveyor in advance of the actuation of said motor means to move the article to the working device, and said motor means being operated in advance of said pneumatic means to return the article from the working device and position and release it upon the conveyor, the pneumatic means for gripping the article being actuated in advance of the raising and lowering means in transferring the article to the working device and the raising and lowering means being actuated in advance of the gripping means in the return of the article from the working device.

10. An apparatus according to claim 5 wherein the means for raising and lowering the arms and for moving the hooked arms are pneumatic means and the means for moving the frame members are motor means, said pneumatic means being article actuated to grip and raise an article from the conveyor in advance of the actuation of said motor means to move the article to the working device, and said motor means being operated in advance of said pneumatic means to return the article from the working device and position and release it upon the conveyor, the pneumatic means for gripping the article being actuated in advance of the raising and lowering means in transferring the article to the working device and the raising and lowering means being actuated in advance of the gripping means in the return of the article from the working device, said motor means in transferring the article to the working device being actuated by one of said frame members as it is raised and in the return movement of the article from the working device being actuated thereby.

11. An apparatus according to claim 5 having centering means, and means for actuating the centering means to center an article before it is transferred to the working device.

12. An apparatus according to claim 5 having centering means, and pneumatic means for actuating the centering means to center an article before it is transferred to the working device.

STANLEY S. JOHNS.

No references cited.